United States Patent [19]

Kitayama

[11] Patent Number: 4,840,453
[45] Date of Patent: Jun. 20, 1989

[54] COMPOSITE OVERHEAD STRANDED CONDUCTOR

[75] Inventor: Yoshinobu Kitayama, Kanagawa, Japan

[73] Assignee: Sumitomo Electric Industries, Ltd., Osaka, Japan

[21] Appl. No.: 852,464

[22] Filed: Apr. 15, 1986

[30] Foreign Application Priority Data

Apr. 17, 1985 [JP] Japan .............................. 60-57908[U]
Dec. 4, 1985 [JP] Japan ............................ 60-187003[U]

[51] Int. Cl.$^4$ ............................................. G02B 6/44
[52] U.S. Cl. ................................................ 350/96.23
[58] Field of Search ....................................... 350/96.23

[56] References Cited

U.S. PATENT DOCUMENTS

| | | | |
|---|---|---|---|
| 4,199,224 | 4/1980 | Oestreich | 350/96.23 |
| 4,312,566 | 1/1982 | Jackson | 350/96.23 |
| 4,422,889 | 12/1983 | Trezeguet et al. | 350/96.23 X |
| 4,448,484 | 5/1984 | Lombardi et al. | 350/96.23 |
| 4,557,558 | 12/1985 | Bresser | 350/96.23 |
| 4,605,818 | 8/1986 | Arroyo et al. | 350/96.23 X |
| 4,653,851 | 3/1987 | Pedersen et al. | 350/96.23 |
| 4,671,610 | 6/1987 | Kitayama et al. | 350/96.23 |
| 4,772,091 | 9/1988 | Oestreich | 350/96.23 |

FOREIGN PATENT DOCUMENTS

2116746  9/1983  United Kingdom .............. 350/96.23

OTHER PUBLICATIONS

Igarashi et al, "Composite Fiber-Optic Overhead Ground Wire", Proceedings of the International Wire & Cable Symposium, Cherry Hill, N.J., U.S.A., Nov. 18-20, 1980, pp. 312-321.

Primary Examiner—John D. Lee
Attorney, Agent, or Firm—Sughrue, Mion, Zinn, Macpeak & Seas

[57] ABSTRACT

A composite overhead stranded conductor capable of accommodating a large number of coated fibers without having a large outside diameter, yet in which the transmission losses due to microbending are reduced. A protective tube is disposed around a spacer having a plurality of spiral grooves formed in its outer periphery for accommodating optical fibers. The optical fibers accommodated within each spiral groove are composed of a plurality of glass fibers having a primary coating layer and which are stranded together with a thin heat-resistant tape applied over the stranded fibers. The heat-resistant tape is applied longitudinally to the fiber strands, and wound therearound with overlapping side edges of the tape joined together. Otherwise the tape may be wound spirally around the fiber strands. Preferably, the tape has a melting point of not less than 200° C. and a thickness of not more than 0.1 mm.

8 Claims, 2 Drawing Sheets

COMPOSITE OVERHEAD STRANDED CONDUCTOR

BACKGROUND OF THE INVENTION

The present invention relates to an improved composite overhead stranded conductor having optical fibers integragated in overhead power transmission line or an aerial ground wire.

Composite overhead stranded conductor having optical fibers integragated in overhead power transmission circuit.

FIG. 1 shows a cross section of a composite overhead stranded conductor of a type known in the art. As shown therein, the conductor has a central fiber unit 1 which is covered with a conductor layer 6 composed of a pluality of stranded conductors 6' such as aluminum-clad steel wires.

The optical fiber unit 1 is composed of a spacer 2 sheathed with a protective tube 5. The spacer 2, which typically is made of aluminum, is provided with a plurality of spiral grooves 3 in its periphery, each groove accommodating a fiber strand 4. The protective tube 5 is also typically made of aluminum. A cross section of one of the stranded fibers 4 housed in each spiral groove 3 is shown in FIG. 3. The fiber consists of optical fiber glass 7 coated with a cushion layer composed of a primary coat 8, typically made of a silicone resin, and a secondary coat 9, typically made of a fluorine resin.

The composite overhead stranded conductor having the construction shown above has adequate mechanical strength since the fiber strand 4 is housed within each of the spiral grooves 3 of the spacer 2 and the spacer in turn is sheathed by the protective tube 5. However, this cable design is not highly adaptable to incorporating a maximum number of coated fibers in the cable because, in order to ensure its use as a substitute for the existing overhead stranded conductors, its outside diameter must be generally equal to that of a conventional overhead stranded conductor, but the space available for accommodating coated fibers in the optical unit 1 is inadequate, being reduced by an amount corresponding to the cross-sectional area of the spacer 2. In addition, the number of grooves that can be formed in the spacer's s periphery is limited in consideration of the outside diameter of the spacer.

Assume, for example, an optical glass fiber 7 having an outside diameter of 125 microns. If a layer of silicone resin is applied over the glass fiber to form a primary coat 8 such as to provide an outside diameter of 0.4 mm, and if a secondary coat 9 typically made of a fluorine resin is subsequently applied to yield an outside diameter of 0.7 mm, then no more than give coated fibers 4 can be accommodated within each of the spiral grooves 3 formed in the periphery of the spacer 2 (which is assumed to have an outside diameter of 4.0 mm).

The composite overhead stranded conductor in use is constantly exposed to high temperatures between 100° and 150° C. and may be heated to nearly 300° C. if a ground fault or inter-phase short circuit failure occurs due to large electric current flowing through the conductor. The transmission loss of an optical fiber is dependent on the temperature. The primary cause of this increase is microbending of the optical glass fiber which occurs when the secondary coat shrinks at elevated temperatures.

SUMMARY OF THE INVENTION

The principal object of the present invention is to provide a composite overhead stranded conductor that is free from the aforementioned problems and which is capable of accommodating a large number of coated fibers without increasing the outside diameter of the optical fiber unit. The present invention is characterized in that a thin heat-resistant tape is applied over a strand of optical fibers with a primary coat before the strand is housed within each of the spiral grooves formed in the periphery of the spacer.

DESCRIPTION OF THE PREFERRED EMBODIMENTS

Figure 1:
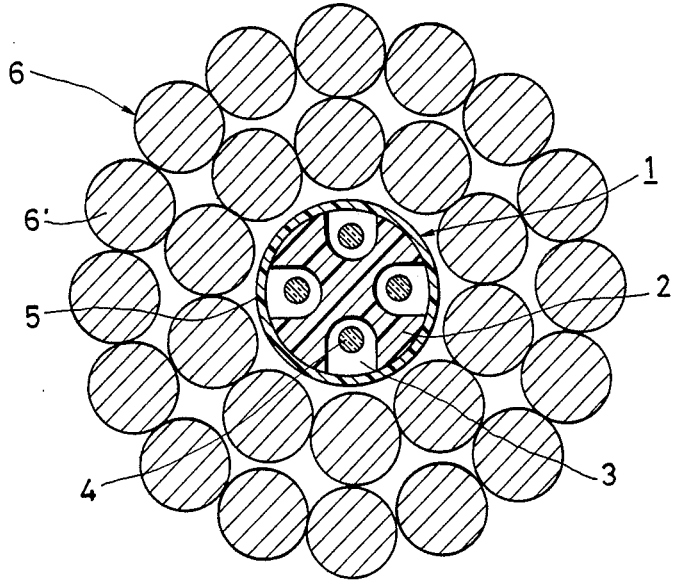
FIG. 1 is a cross section of a typical composite overhead stranded conductor.
Figure 2A:
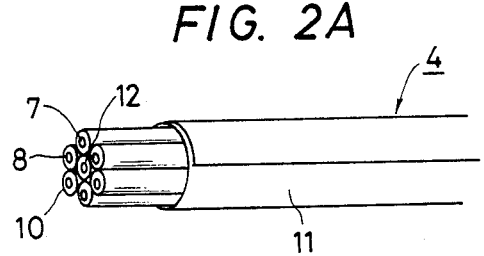
FIGS. 2A and 2B are perspective views of two embodiments of an optical fiber strand for incorporation in the composite stranded conductor of the present invention.
Figure 3:
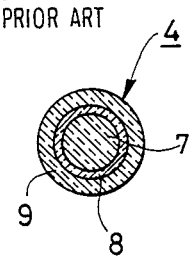
FIG. 3 is a cross section of a single coated optical fiber prepared by the conventional method.
Figure 2B:
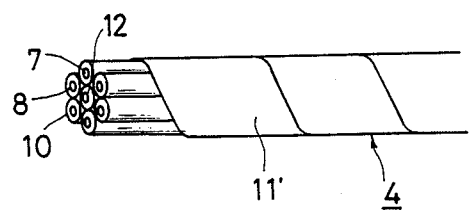

Two embodiments of an optical fiber strand 4 which is to be housed within each of the spiral grooves 3 of the spacer 2 of the composite stranded conductor shown in FIG. 1 are illustrated in FIGS. 2A and 2B.

In both embodiments, a plurality of optical glass fibers 7 having an outside diameter of, for example, 125 microns are provided with a primary coat 8 to yield an outside diameter of 0.4 mm, and the resulting fibers 10 are stranded around a tension member 12. In the embodiment shown in FIG. 2A, a thin heat-resistant tape 11, typically made of a tetrafluoride resin 0.075 mm thick and 6 mm wide, is applied longitudinally and wound around the fiber strand, with the overlapping side edges of the tape 11 being joined with an adhesive. In the embodiment shown in FIG. 2B, a thin heat-resistant tape 11', typically a polyimide tape with a thickness of 0.0125 mm, is spirally wound around the fiber strand by an appropriate method of winding such as lap winding, butt winding, or open spiral winding. The tension member 12 is preferably made of a nonmetallic material.

The tape material is not limited to those used in the embodiments shown above, and appropriate thin heat-resistant tapes made of engineering plastics such as fluorine resins other than the tetrafluoride resin and PPS (polypphenylene sulfide) resin may be selected depending upon the specific heat resistance requirements.

Microbending may occur in the optical fibers if their coat shrinks under elevated temperatures. In addition, some lateral compression inevitably occurs because of the unevenness of the surface of the tape-wound unit that is introduced by the thickness of the heatresistant tape. In order to reduce the occurrence of microbending and lateral compression, the heat-resistant tape is desirably not thicker than 0.1 mm.

Figure 4:
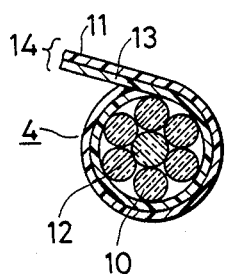
FIGS. 4 and 5 are cross sections of two additional embodiments of an optical fiber strand for incorporation in the composite stranded conductor of the present invention.

FIG. 4 shows an embodiment using a multi-layered heat-resistant tape. As shown, a plurality of coated optical fibers 10 are stranded around a tension member 12, and a two-layered tape 14 consisting of an outer thin heat-resistant tape 11 and an inner cushion layer 13 is wound transversely around the fiber strand. This design provides an optical fiber strand 4 with improved lateral compressibility. The cushion layer 13 may be formed of any material that has a lower Young's s modulus than the heat-resistant tape 11 and which provides appropriate cushioning properties.

Figure 5:
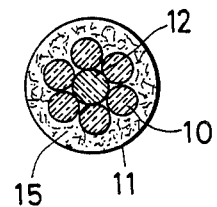

FIG. 5 shows an embodiment wherein a plurality of coated optical fibers 10 are stranded around a tension member 12, and a continuous cushion layer filled with heat-resistant fibers 15, such as one made of Kevlar is applied over the fiber strands before a thin heat-resistant tape 11 is wound transversally around the fiber strands. As in the embodiment shown in FIG. 4, the cushion layer provides improved lateral compressibility. In addition, if the temperature of the spacer increases momentarily upon transmission line failure, the cushion layer acts as a heat insulator so that the increase in the temperature of the optical fibers is held to a minimum.

Figure 6:
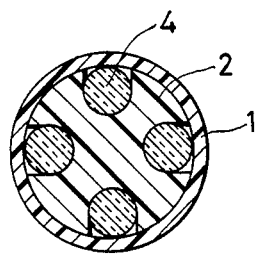
FIG. 6 is a cross section of an optical fiber unit wherein a fiber strand having the configuration shown in FIG. 5 is tightly housed within each of the grooves formed in the spacer.

FIG. 6 shows an optical fiber unit wherein a fiber strand of the structure shown in FIG. 5, which is provided with a heat-resistant fiber filled cushion layer before a thin heat-resistant tape is wound transversally around it, is tightly housed within respective spiral grooves formed in the periphery of the spacer which are substantially equal to or smaller in size than the outside diameter of the respective fiber strands. Because of the elastic nature of the cushion layer, the fiber strand is closely confined within each groove and becomes an integral part of the spacer so that local microbending will not occur in the optical fibers, even if the cable is stretched or contracts as a result of tension on the cable, vibration due to the wind, short circuiting, and lightning strikes.

The composite overhead stranded conductor of the present invention has the followig advantages:

(1) Although the transmission loss of optical fibers generally increases at elevated temperatures because if microbending which occurs as a result of thermal shrinking of the secondary coat on the fiber, because the optical fibers incorporated in the composite cable of the present invention have a heat-resistant tape as their secondary coat and its thickness is no more than a half of 0.15 mm, which is the minimum value attainable by prior art extrusion-molding techniques in consideration of prevailing manufacturing conditions, the stress which is exerted on the optical fibers as a result of the shrinking of the secondary coat is reduced to a minimum.

(2) The optical fibers incorporated in the composite stranded conductor have the concomitant advantage that they permit far easier removal of the secondary coat for splicing or otherwise forming connections than prior art optical fibers, which are provided with the secondary coat by means of extrusion molding.

(3) The fiber design employed in the composite stranded conductor of the present invention is more advantageous for the purpose of realizing a smaller-diameter multi-fiber unit as compared with optical fibers having the prior art secondary coat.

(4) The optical fiber design employed in the present invention provides better reliability and transmission characteristics than when a plurality of optical fibers are loosely housed within a groove of the spacer without being bundled together by the heat-resistant tape. In this loose design, the coefficient of friction between individual fibers and that between each fiber and the inner surface of a groove of the spacer are not distributed uniformly in the longitudinal direction and the optical fibers are free to move around individually within the groove. Therefore, local strain will easily develop in the fibers when they are subjected to external forces such as stretching, contraction and vibration.

The aforementioned problem is particularly great when the primary coat is made of a silicone resin having a high frictional coefficient. When a plurality of optical fibers having such silicone coat are housed in a groove without being bundled together, the degree of contact between the silicone coat and the inner surface of the groove varies along the fiber length, and the resulting longitudinal unevenness in the frictional force that develops between the fiber and the inner surface of the groove allows local stress and microbending to occur in the optical fibers when the composite stranded conductor is subjected to external forces such as shrinkage and vibration. In accordance with the present invention, a plurality of optical fibers are assembled and bundled together by the heat-resistant tape to form an integral fiber strand. Since the frictional force which develops between this fiber strand and the inner surface of the groove is uniform in the longitudinal direction of the cable, individual fiber strands can slide in the groove without increasing the transmission loss of the cable.

Figure 7:
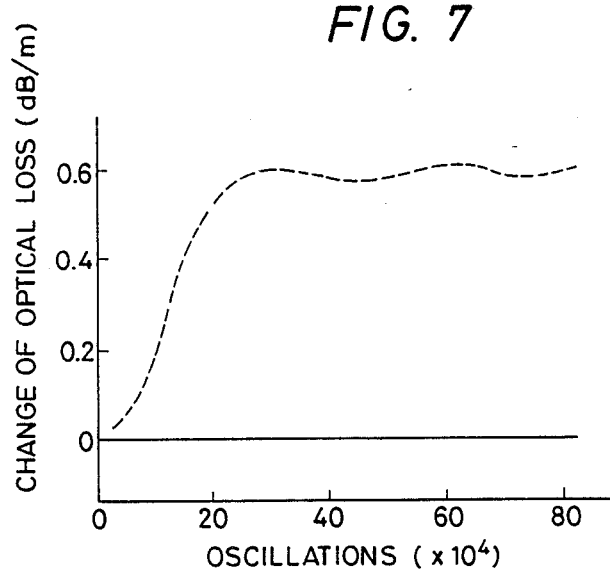
FIG. 7 is a characteristic graph showing the results of a vibration test conducted with optical fiber units.

FIG. 7 shows the relationship between oscillations (amplitude, +5 mm; frequency, 35 Hz) applied to optical fiber units 10 m long and the resulting variation in the transmission loss of the optical fibers as measured on a continuous basis. The results obtained from the optical fiber designs of the present invention depicted in FIGS. 2A and 2B are indicated by a solid line. The dotted curve plots the results obtained from a fiber unit wherein an assembly of fibers was housed within each of the grooves in the spacer without being bundled together by a heat-resistant tape. As shown, the variation-caused increase in transmission loss, which was as great as 0.6 dB/m, could be reduced to zero by employing the present invention.

I claim:

1. In a composite overhead stranded conductor having an optical fiber comprising a protective tube disposed around a spacer having a plurality of spiral grooves formed in its periphery for accommodating optical fibers, the improvement wherein the optical fibers accommodated within each spiral groove comprises a plurality of glass fibers, each having a primary coating layer bonded thereto, said glass fibers being stranded together with a thin heat-resistant tape applied to and over the stranded fibers, contacting the stranded fibers continuously over an axial direction of said tube and holding them in a bundle such that the outer diameter of said bundle is approximately the same as the outer diameter of said stranded fibers.

2. The composite overhead stranded conductor according to claim 1, wherein said thin heat-resistant tape is applied longitudinally to the fiber strands and is wound therearound with overlapping side edges of said tape being joined together.

3. The composite overhead stranded conductor according to claim 1, wherein said thin heat-resistant tape is wound spirally around said fiber strands.

4. The composite overhead stranded conductor according to claim 1, wherein said heat-resistant tape has a melting point of not less than 200° C. and a thickness of not more than 0.1 mm.

5. The composite overhead stranded conductor according to claim 1, wherein said glass fibers are coated with silicon resin and have an outer diameter of not more than 0.6 mm.

6. In a composite overhead stranded conductor having an optical fiber comprising a protective tube disposed around a spacer having a plurality of spiral grooves formed in its periphery for accommodating optical fibers, the improvement wherein the optical fibers accommodated within each spiral groove comprises a plurality of glass fibers, each having a primary coating layer bonded thereto, said glass fibers being stranded together with a thin heat-resistant tape applied to and over the stranded fibers, contacting the stranded fibers continuously over an axial direction of said tube and holding them in a bundle, wherein said thin heat-resistant tape comprises at least two layers, an innermost layer of said layers adjacent said fiber strands having a Young's s modulus lower than that of any outer layer thereof, said innermost layer providing cushioning properties.

7. In a composite overhead stranded conductor having an optical fiber comprising a protective tube disposed around a spacer having a plurality of spiral grooves formed in its periphery for accommodating optical fibers, the improvement wherein the optical fibers accommodated within each spiral groove comprises a plurality of glass fibers, each having a primary coating layer bonded thereto, said glass fibers being stranded together and having a continuous cushion layer formed of heat-resistant fibers applied thereto with a thin heat-resistant tape applied to and over the continuous cushion layer, said tape contacting the continuous cushion layer continuously over an axial direction of said tube and thus holding the stranded fibers in a bundle.

8. The composite overhead stranded conductor according to claim 7, wherein each of said grooves of said spacer is substantially equal to or smaller in size than the outside diameter of each said bundle of said optical fibers, so that each said bundle of optical fibers is closely confined within each of said grooves.

* * * * *